(12) United States Patent
Ueda

(10) Patent No.: US 7,898,591 B2
(45) Date of Patent: Mar. 1, 2011

(54) METHOD AND APPARATUS FOR IMAGING USING SENSITIVITY COEFFICIENTS

(75) Inventor: Tomoaki Ueda, Tokyo (JP)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 12/640,986

(22) Filed: Dec. 17, 2009

(65) Prior Publication Data

US 2010/0245654 A1    Sep. 30, 2010

(30) Foreign Application Priority Data

Mar. 30, 2009    (JP) .................................. 2009-82395

(51) Int. Cl.
*H04N 5/225* (2006.01)
(52) U.S. Cl. ...................................... 348/340; 348/222.1
(58) Field of Classification Search ............... 348/222.1, 348/241, 340
See application file for complete search history.

(56) References Cited

U.S. PATENT DOCUMENTS

| | | | |
|---|---|---|---|
| 2002/0036257 A1* | 3/2002 | Yamashita et al. ......... | 250/208.1 |
| 2002/0094131 A1* | 7/2002 | Shirakawa .................... | 382/274 |
| 2005/0151873 A1* | 7/2005 | Murakami .................... | 348/340 |
| 2006/0250509 A1 | 11/2006 | Koshiba | |
| 2007/0091197 A1* | 4/2007 | Okayama et al. ............. | 348/340 |
| 2008/0007804 A1 | 1/2008 | Min et al. | |
| 2009/0122166 A1* | 5/2009 | Suzuki .......................... | 348/242 |

FOREIGN PATENT DOCUMENTS

| | | |
|---|---|---|
| JP | 2004-031532 | 1/2004 |
| JP | 2006-303995 | 11/2006 |
| JP | 2007-096825 | 4/2007 |
| JP | 2008-017486 | 1/2008 |

OTHER PUBLICATIONS

An Office Action issued in Japanese Patent Application No. 2009-082395 mailed Jun. 12, 2009 (with English abstract).

* cited by examiner

*Primary Examiner* — Gevell Selby
(74) *Attorney, Agent, or Firm* — Foley & Lardner LLP

(57) ABSTRACT

An image pickup device includes an image pickup unit including an n number of photodetectors and an n number of lenses, and outputting signals corresponding to the respective photodetectors, the lenses being provided in a one-to-one correspondence with the photodetectors and being provided so that light is incident upon only the respective photodetectors; a sensitivity coefficient storage section that stores information for determining sensitivity coefficients of the photodetectors; and an image reproducing section that reproduces an image using the signals that are output by the image pickup unit and the sensitivity coefficients that are determined on the basis of the information stored in the sensitivity coefficient storage section. In a model in which light from imaginary light spots is received by the respective photodetectors, using the output signals and the sensitivity coefficients corresponding to the respective photodetectors, the image reproducing section estimates light beams of the respective imaginary light spots, and using brightness values corresponding thereto as brightness values of respective pixels of an image corresponding to an image pickup area, the image reproducing section reproduces an image.

10 Claims, 8 Drawing Sheets

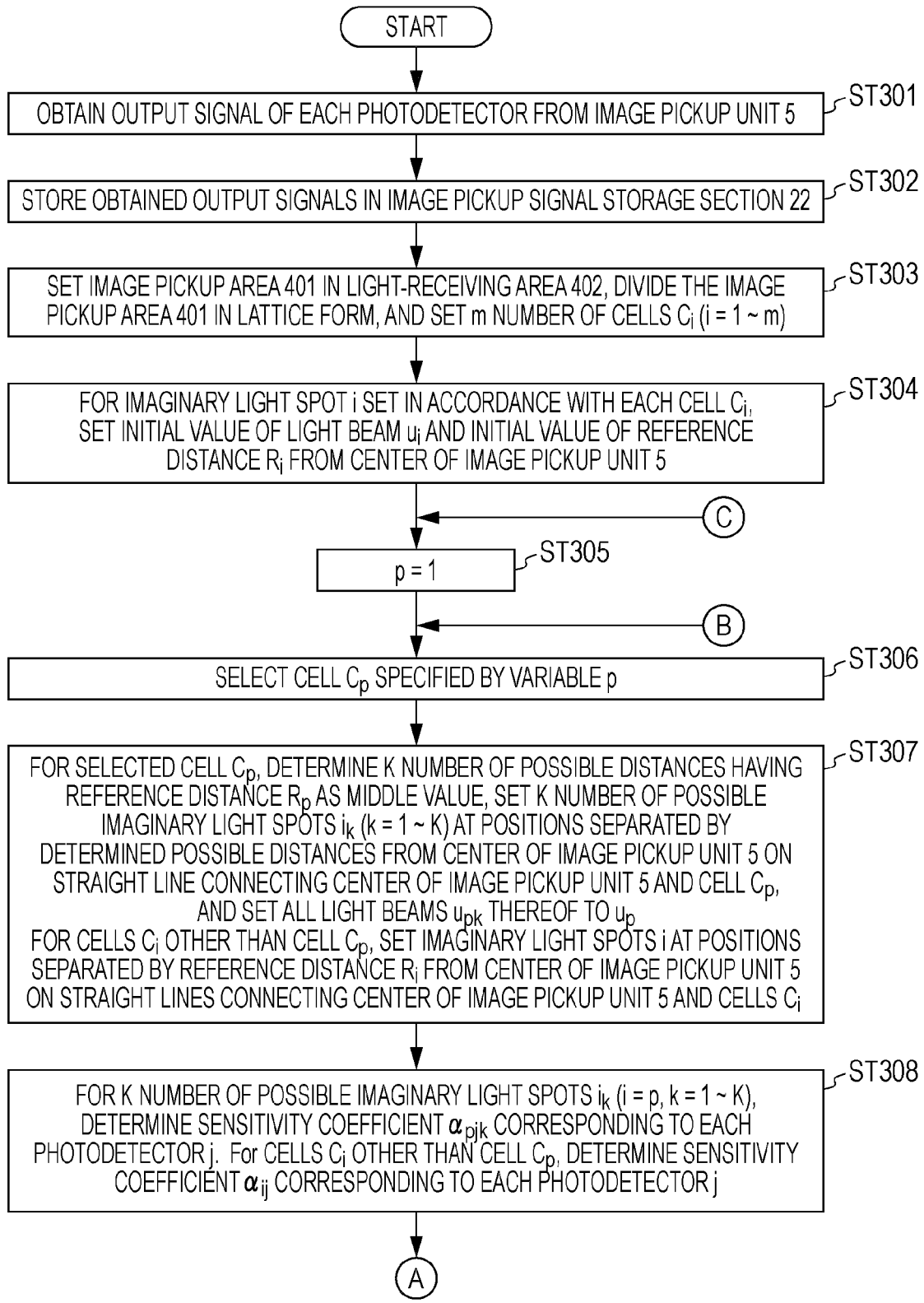

FIG. 7A
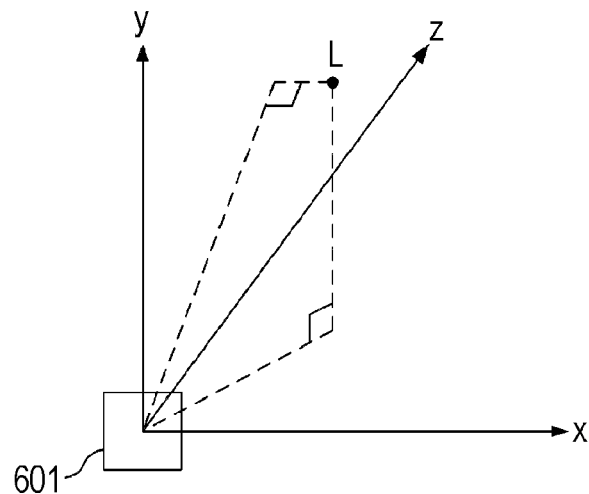
FIG. 7B
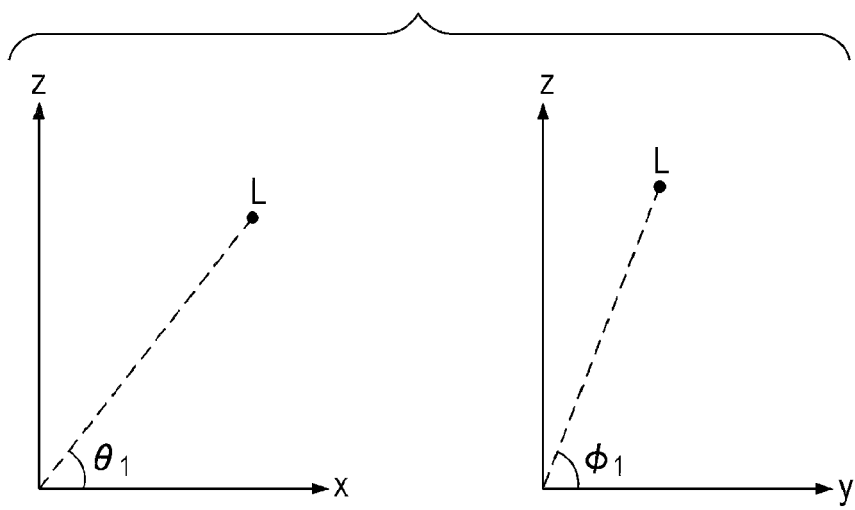
FIG. 7C
| $\theta$ | $\phi$ | $f(\theta,\phi)$ |
|---|---|---|
| 0 | 0 | |
| 0 | 5 | |
| 0 | 10 | |
| ⋮ | ⋮ | |
| 170 | 180 | |
| 175 | 180 | |
| 180 | 180 | |

METHOD AND APPARATUS FOR IMAGING USING SENSITIVITY COEFFICIENTS

This application claims the benefit of Japanese Application No. 2009-82395 filed on Mar. 30, 2009 which is incorporated herein by reference.

BACKGROUND OF THE INVENTION

1. Field of the Invention

The present disclosure relates to an image pickup technology using a solid-state image pickup element.

2. Description of the Related Art

As discussed in, for example, Japanese Unexamined Patent Application Publication No. 2007-96825, a related compound-eye image pickup device using solid-state image pickup elements (photodetectors) uses a structure in which a plurality of lenses and a set of photodetectors (disposed for the respective lenses) are disposed so as to be separated from each other by a focal length of each lens, and, in which, from a plurality of images picked up by the set of photodetectors, parallax information of each image is used to reproduce one image.

However, the related compound-eye image pickup device having such a structure has the following problems:

(1) Since it is necessary to dispose the photodetectors so as to be separated from the lenses by the focal length, the image pickup device becomes thick. Although it is possible to shorten the focal length by using lenses having high refractive indices, aberrations, such as chromatic aberration, are inevitably increased, thereby reducing image quality of a picked up image;

(2) Since, in an ordinary image pickup device, a focusing operation must be performed in accordance with the distance to a pickup object when an image pickup operation is performed, it is difficult to perform continuous shooting operations by changing a focus. For example, if a lens system includes one lens, the lens must be replaced in accordance with the focal length. In addition, if a lens system includes a plurality of lenses, focusing must be performed by changing the distance between the lenses. Such problems also similarly occur in the compound-eye image pickup device; and (3) A step for aligning the lens system and the photodetectors when manufacturing the image pickup device is required. This step causes costs of a product to be increased.

Therefore, there is a demand for overcoming these problems.

SUMMARY OF THE INVENTION

According to an aspect of the present invention, there is provided an image pickup device that includes an image pickup unit including an n number of photodetectors and an n number of lenses (where n>=2), the lenses being provided in a one-to-one correspondence with the photodetectors, the lenses being provided so that light is incident upon only the respective photodetectors, the image pickup unit outputting signals corresponding to the respective photodetectors; a sensitivity coefficient storage section that stores information for determining sensitivity coefficients of the photodetectors; and an image reproducing section that reproduces an image using the signals that are output by the image pickup unit and the sensitivity coefficients that are determined on the basis of the information stored in the sensitivity coefficient storage section. The image reproducing section includes part for obtaining the signals that are output by the image pickup unit; part for setting a plurality of imaginary light spots in an image pickup area so that a number m of imaginary light spots≦the number n of photodetectors; part for determining the sensitivity coefficient corresponding to each imaginary light spot for each photodetector on the basis of the information stored in the sensitivity coefficient storage section; part for determining $u_i$ so that $E_{ev}$ determined by the following formula is equal to or less than a threshold value $\epsilon$:

$$E_{ev} = \sum_{j=1}^{n} r_{ij}^2 \cdot \left( S_j - \sum_{i=1}^{m} \alpha_{ij} \cdot u_i \right)^2$$

where a light beam of an imaginary light spot i is $u_i$, the sensitivity coefficient of a photodetector j corresponding to the imaginary light spot i is $\alpha_{ij}$, the distance between the imaginary light spot i and the photodetector j is $r_{ij}$, and the signal corresponding to the photodetector j that is output by the image pickup unit is $S_j$; and part for forming and outputting the image using the determined $u_i$.

According to another aspect of the present invention, there is provided an image pickup device that includes an image pickup unit including an n number of photodetectors and an n number of lenses (where n>=2), the lenses being provided in a one-to-one correspondence with the photodetectors, the image pickup unit outputting signals corresponding to the respective photodetectors; and an image reproducing section which, on the basis of a model in which a plurality of imaginary light spots are set in an image pickup area and light from the imaginary light spots is received by the respective photodetectors, forms and outputs an image using light beams of the respective imaginary light spots that are determined using the signals corresponding to the respective photodetectors that are output by the image pickup unit and using sensitivity coefficients of the respective photodetectors corresponding to the respective imaginary light spots.

The lenses may be superposed upon the respective photodetectors so that light is incident upon only the respective photodetectors.

According to still another aspect of the present invention, there is provided an image pickup device that includes an image pickup unit including an n number of photodetectors and an n number of lenses (where n>=2), the lenses being provided in a one-to-one correspondence with the photodetectors, the image pickup unit outputting signals corresponding to the respective photodetectors; a sensitivity coefficient storage section that stores information for determining sensitivity coefficients of the photodetectors; and an image reproducing section that reproduces an image using the signals that are output by the image pickup unit and the sensitivity coefficients that are determined on the basis of the information stored in the sensitivity coefficient storage section. The image reproducing section includes part for obtaining the signals that are output by the image pickup unit; part for setting a plurality of imaginary light spots in an image pickup area so that a number m of imaginary light spots≦the number n of photodetectors; part for determining the sensitivity coefficient corresponding to each imaginary light spot for each photodetector on the basis of the information stored in the sensitivity coefficient storage section; part for determining $u_i$ so that $E_{ev}$ determined by the following formula is equal to or less than a threshold value $\epsilon$:

$$E_{ev} = \sum_{j=1}^{n} r_{ij}^2 \cdot \left( S_j - \sum_{i=1}^{m} \alpha_{ij} \cdot u_i \right)^2$$

where a light beam of an imaginary light spot i is $u_i$, the sensitivity coefficient of a photodetector j corresponding to the imaginary light spot i is $\alpha_{ij}$, the distance between the imaginary light spot i and the photodetector j is $r_{ij}$, and the signal corresponding to the photodetector j that is output by the image pickup unit is $S_j$; and part for forming and outputting the image using the determined $u_i$.

The image pickup device may further include a display unit that displays the output image, wherein the photodetectors are disposed at a display screen of the display unit.

The image pickup device may be such that the information stored in the sensitivity coefficient storage section includes at least information regarding a function $f(\theta, \phi)$ indicating the characteristics of the lenses, where, in a three-dimensional coordinate system in which a light-receiving plane of the photodetectors matches an XY plane, $\theta$ is an angle between an XZ plane and a direction from the center of each photodetector to each imaginary light spot, and $\phi$ is an angle between a YZ plane and the direction from each photodetector to each imaginary light spot.

The part for setting the imaginary light spots may set the image pickup area or the imaginary light spots on the basis of an input of a user.

The image pickup device may further include an image pickup signal storage section that stores the signals output by the image pickup unit, wherein, if a shooting instruction is given by a user, the part for obtaining the signals stores the signals obtained from the image pickup unit in the image pickup signal storage section, and wherein, if an instruction of image reproduction is given from the user, the part for determining $u_i$ reads out the signal $S_j$ corresponding to the photodetector j output by the image pickup unit from the image pickup signal storage section.

According to still another aspect of the present invention, there is provided an image reproducing device that includes part for obtaining signals corresponding to respective photodetectors that are output from an image pickup unit including an n number of photodetectors (where n>=2) and an n number of lenses that are provided in a one-to-one correspondence with the photodetectors; a sensitivity coefficient storage section that stores information for determining sensitivity coefficients of the photodetectors; part for setting a plurality of imaginary light spots i in an image pickup area so that a number m of imaginary light spots≦the number n of photodetectors; part for determining the sensitivity coefficient corresponding to each imaginary light spot for each photodetector on the basis of the information stored in the sensitivity coefficient storage section; part for determining $u_i$ so that $E_{ev}$ determined by the following formula is equal to or less than a threshold value $\epsilon$:

$$E_{ev} = \sum_{j=1}^{n} r_{ij}^2 \cdot \left( S_j - \sum_{i=1}^{m} \alpha_{ij} \cdot u_i \right)^2$$

where a light beam of an imaginary light spot i is $u_i$, the sensitivity coefficient of a photodetector j corresponding to the imaginary light spot i is $\alpha_{ij}$, the distance between the imaginary light spot i and the photodetector j is $r_{ij}$, and the signal corresponding to the photodetector j that is output by the image pickup unit is $S_j$; and part for forming and outputting an image using the determined $u_i$.

According to still another aspect of the present invention, there is provided a method of reproducing an image, which includes the steps of obtaining signals that are output from an image pickup unit including an n number of photodetectors and an n number of lenses (where n>=2) provided in a one-to-one correspondence with the photodetectors; setting a plurality of imaginary light spots in an image pickup area so that a number m of imaginary light spots≦a number n of photodetectors; determining sensitivity coefficients corresponding to the respective imaginary light spots for the respective photodetectors; determining $u_i$ so that $E_{ev}$ determined by the following Formula is equal to or less than a threshold value $\epsilon$:

$$E_{ev} = \sum_{j=1}^{n} r_{ij}^2 \cdot \left( S_j - \sum_{i=1}^{m} \alpha_{ij} \cdot u_i \right)^2$$

where a light beam of an imaginary light spot i is $u_i$, the sensitivity coefficient of a photodetector j corresponding to the imaginary light spot i is $\alpha_{ij}$, the distance between the imaginary light spot i and the photodetector j is $r_{ij}$, and the signal corresponding to the photodetector j that is output from the image pickup unit is $S_j$; and forming and outputting the image using the determined $u_i$.

In the present disclosure, the term "part" not only simply refers to "physical part," but also refers to a case in which the function of the part is realized by software. In addition, the function of one part or one device may be realized by two or more physical parts or physical devices, or the functions of two or more parts or devices may be realized by one physical part or one physical device.

BRIEF DESCRIPTION OF THE DRAWINGS

FIG. 5 is a flowchart of operations of an image reproducing section 23 of the image pickup device 1;

FIGS. 7A and 7B illustrate the relationships between the position of a photodetector 601 and a light source L relative to each other;

FIG. 7C shows a table that stores $f(\theta, \phi)$ values;

DESCRIPTION OF THE PREFERRED EMBODIMENTS

An image pickup device 1 and an image pickup method according to an embodiment will hereunder be described with reference to the drawings.

Figure 1:
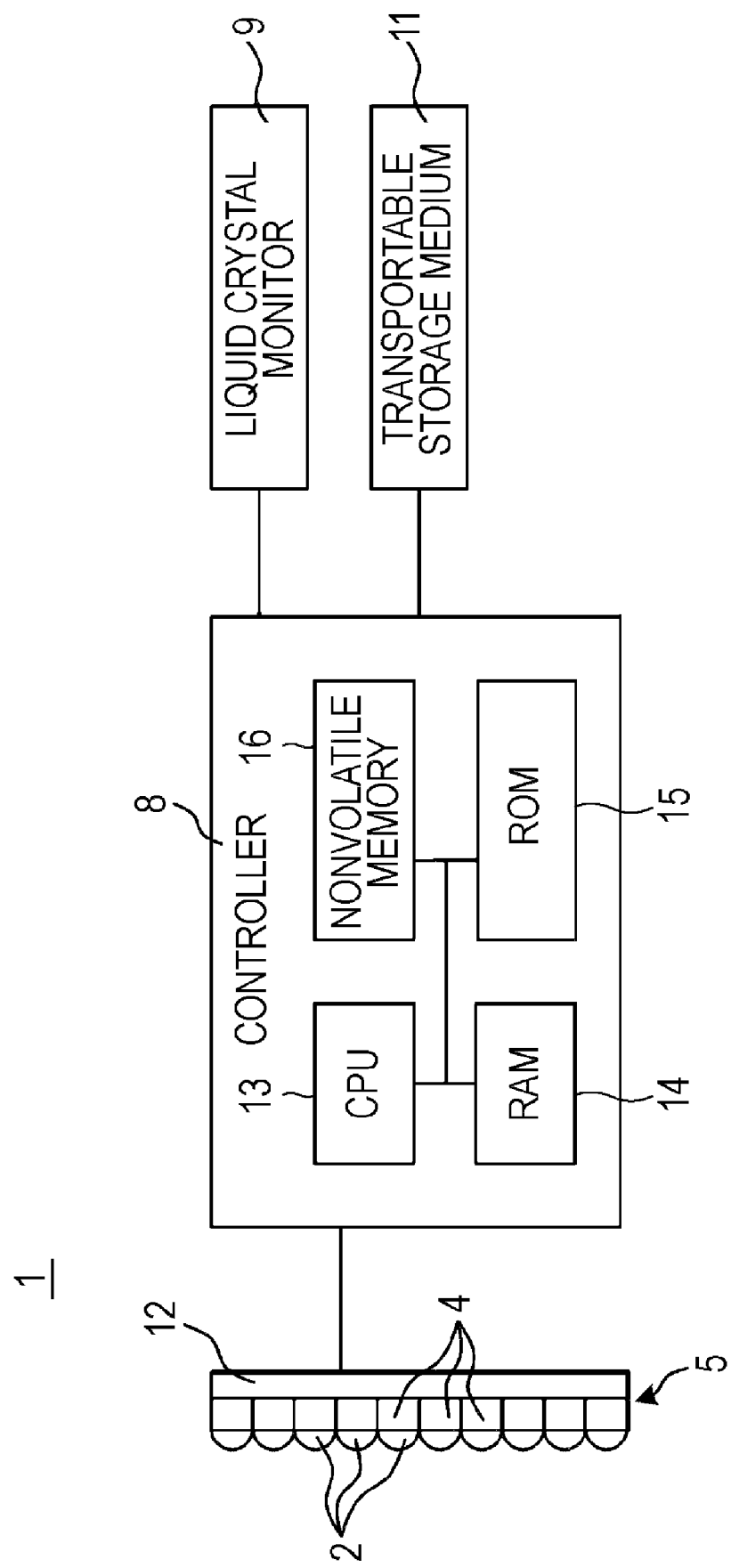
FIG. 1 shows the structure of hardware of an image pickup device 1.

FIG. 1 shows the structure of hardware of the image pickup device 1.

The image pickup device 1 according to the embodiment is formed so as to include an image pickup unit 5, a controller 8 that reproduces an image on the basis of an output signal that is output by the image pickup unit 5, a liquid crystal monitor that displays information of, for example, a reproduced image, and a transportable storage medium (such as a memory card) 11 that stores data of, for example, the reproduced image or the output signal from the image pickup unit 5. Although the image pickup device 1 includes mechanisms (such as a shutter mechanism for a pickup operation) similar to the mechanisms of related image pickup devices, these mechanisms will not be illustrated.

The image pickup unit 5 includes an n number of photodetectors 4 (where n>=2), an n number of lenses 2 (provided in a one-to-one correspondence with the photodetectors 4), and a mechanism for outputting signals corresponding to the respective photodetectors 4.

As the photodetectors 4, photodiodes or the like may be used similarly to related image sensors. The photodetectors 4 are disposed in an array in a plane on a base substrate 12 in the image pickup unit 5. As a mechanism for outputting a signal based on the quantity of light received by each photodetector 4, for example, a mechanism (charge coupled device (CCD) unit) that transfers a signal subjected to photoelectric conversion at each photodetector 4, a complementary metal oxide semiconductor (CMOS) device, a circuit that performs A/D conversion on the signal subjected to the photoelectric conversion, or a circuit that removes noise may also be disposed on the base substrate.

Figure 2:
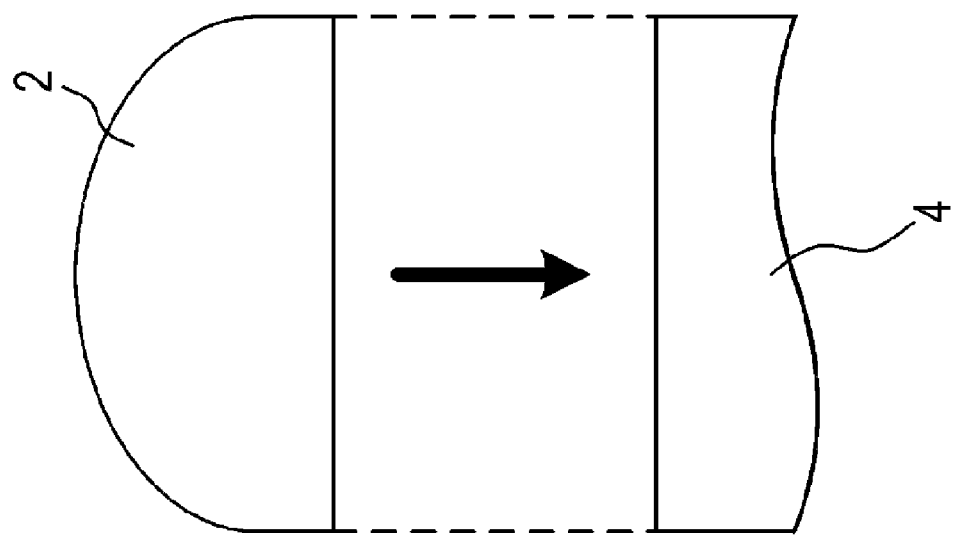
FIG. 2 shows lenses 2 and photodetectors 4 being superposed upon each other.

The lenses 2 are provided on a one-to-one correspondence with the photodetectors 4. More specifically, as shown in FIG. 2, the lenses 2 are superposed upon and disposed at their respective photodetectors 4 so that light passing through the lenses 2 is only incident upon their respective photodetectors 4. In the case where the photodetectors 4 are, for example, circular, if hemispherical or plano-convex lenses having planar faces that match the circular shape are used as the lenses 2, it is possible to place the planar faces of the lenses 2 in close contact with the surfaces of the photodetectors 4 and to dispose them so that light passing through the lenses 2 is incident upon only the respective photodetectors 4.

Methods of causing the lenses 2 to be in a one-to-one correspondence with the respective photodetectors 4 include, for example, a method in which the lenses 2 are directly formed on the photodetectors 4 or a method in which a photodetector array and a lens array are formed and both of them are superimposed upon each other so that the photodetectors and the lenses are in a one-to-one correspondence. Alternatively, another method is available. In this method, the lenses 2 and the photodetectors 4 are caused to be in a one-to-one correspondence by, after the lenses 2 and the photodetectors 4 are disposed so as to be separated from each other by a predetermined distance, surrounding gaps between the lenses 2 and the photodetectors 4 by predetermined members (such as related light-shielding blocks) so that light passing through lenses other than the lenses 2 corresponding to the respective photodetectors 4 is not incident upon the photodetectors 4.

The controller 8 may be formed as a typical information processing unit or a dedicated device including, for example, CPU 13, a memory (such as a random access memory (RAM) 14, a read only memory (ROM) 15, and a rewritable nonvolatile memory 16).

Figure 3:
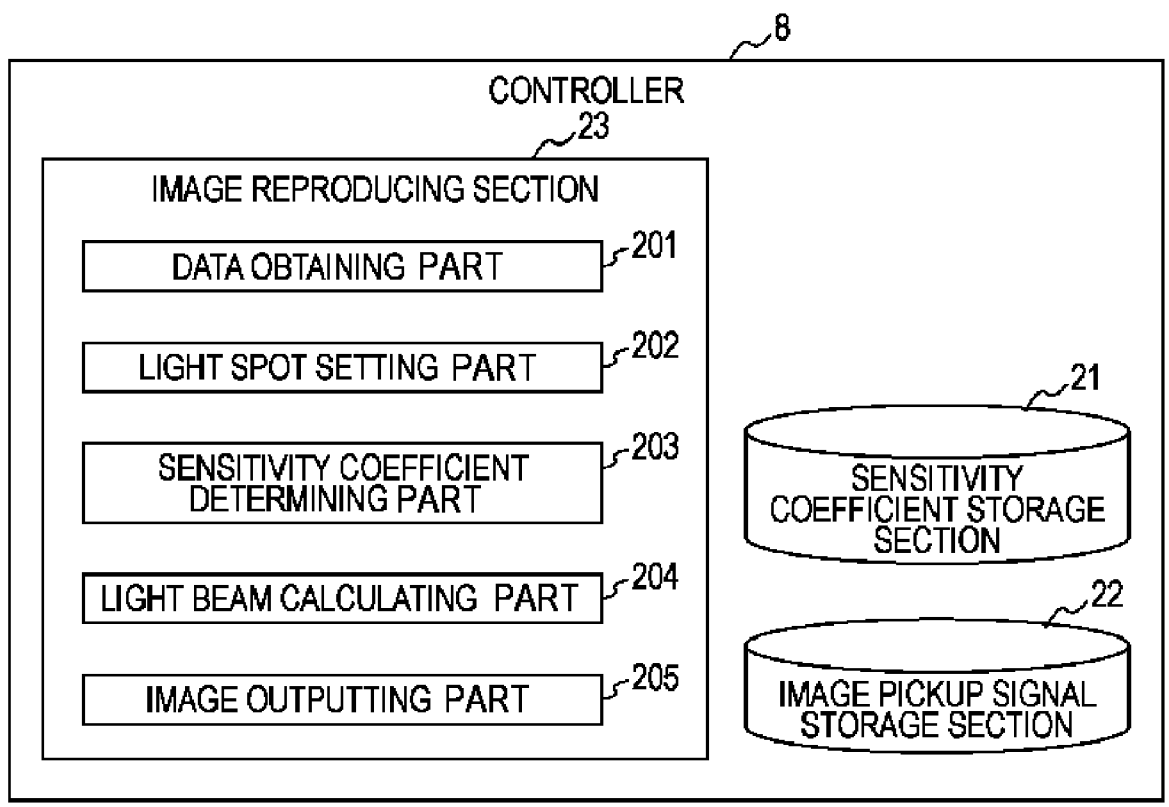
FIG. 3 shows a functional structure of a controller 8.

FIG. 3 shows a functional structure of the controller 8.

The controller 8 includes, as functional means, a sensitivity coefficient storage section 21 that stores information for determining the sensitivity coefficient of each photodetector 4 of the image pickup unit 5, an image pickup signal storage section 22 that stores signals that are output by the image pickup unit 5, and an image reproducing section 23 that reproduces an image using the signals that are output by the image pickup unit 5 and using the sensitivity coefficients that are determined on the basis of the information stored in the sensitivity coefficient storage section 21.

The sensitivity coefficient storage section 21 is functionally achieved by, for example, ROM 15. On the other hand, the image pickup signal storage section 22 is functionally achieved by, for example, the transportable storage medium 11 or the rewritable nonvolatile memory 16.

The image reproducing section 23 is functionally achieved when CPU 13 reads a program stored in, for example, ROM 15 out at RAM 14 and execute it.

Using a model in which it is assumed that a plurality of imaginary light spots exist in an image pickup area, and in which light from the plurality of imaginary light spots is received by the respective photodetectors, the image reproducing section 23 estimates light beams of the respective imaginary light spots using the sensitivity coefficients and the output signals corresponding to the respective photodetectors. Using brightnesses corresponding to the estimated light beams as brightnesses of pixels of an image, corresponding to the image pickup area, the image reproducing section 23 reproduces the image. For the relationship between the light beams and the corresponding brightnesses, it is possible to use a linear or a nonlinear gamma curve.

More specifically, the image reproducing section 23 includes data obtaining part 201, light spot setting part 202, sensitivity coefficient determining part 203, light beam calculating part 204, and image outputting part 205. The data obtaining part 201 obtains the output signals that are output from the image pickup unit 5. The light spot setting part 202 sets the plurality of imaginary light spots in the image pickup area so that a number m of imaginary light spots≦a number n of photodetectors. The sensitivity coefficient determining part 203 determines the sensitivity coefficients corresponding to the respective imaginary light spots for the respective photodetectors 4 on the basis of the information stored in the sensitivity coefficient storage section 21. If the light beam at an imaginary light spot i is $u_i$, the sensitivity coefficient of a photodetector j corresponding to the imaginary light spot i is $\alpha a_{ij}$, the distance between the imaginary light spot i and the photodetector j is $r_{ij}$, and the output signal of the photodetector j that is output from the image pickup unit 5 is $S_j$, the light beam calculating part 204 determines $u_i$ so that a value of $E_{ev}$ determined by the following Formula (1) becomes smaller than a predetermined threshold value $\epsilon$:

$$E_{ev} = \sum_{j=1}^{n} r_{ij}^2 \cdot \left( S_j - \sum_{i=1}^{m} \alpha_{ij} \cdot u_i \right)^2 \quad (1)$$

The image outputting part 205 forms and outputs an image using the determined $u_i$.

First, a method of setting the imaginary light spots in the image pickup area will be described.

Figure 4A:
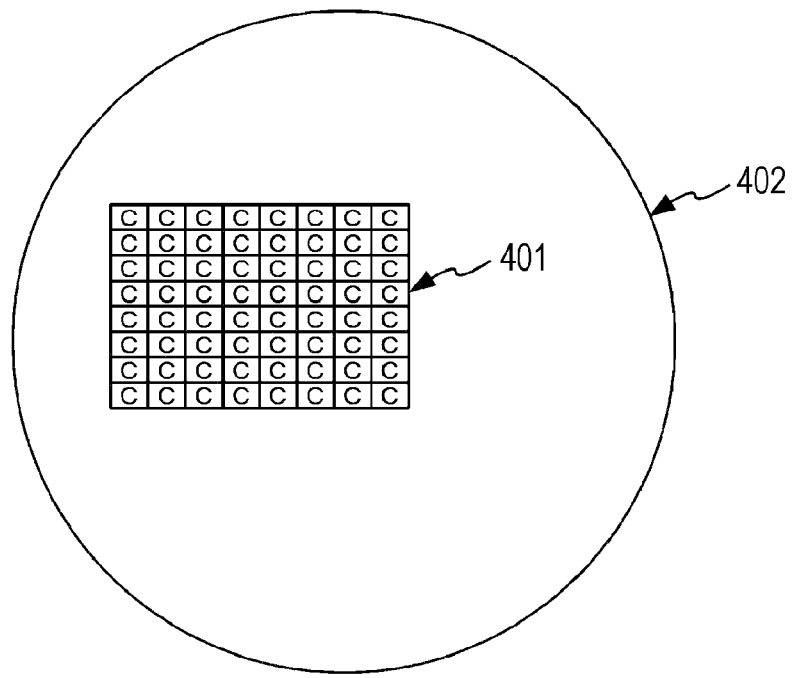
FIG. 4A shows an image pickup area 401 that is set in a light receiving area 402, and a plurality of cells C that are set in the image pickup area 401.

As shown in FIG. 4A, an image pickup area 401 is an area that is subjected to image reproduction among an entire area (hereunder referred to as "light-receiving area") 402 where the image pickup unit 5 is capable of receiving light. The position and the size of the image pickup area 401 in the light-receiving area 402 may be previously determined, or may be specified by a user each time a shooting operation or image reproduction is performed.

As shown in FIG. 4A, the imaginary light spots are set to the image pickup area 401 by dividing the image pickup area 401 into a lattice form, and setting cells C corresponding to respective pixels of a reproduction image, and performing setting operations on these cells C. A number m of cells C (the number m of imaginary light spots) must be less than or equal to the number n of photodetectors.

Figure 4B:
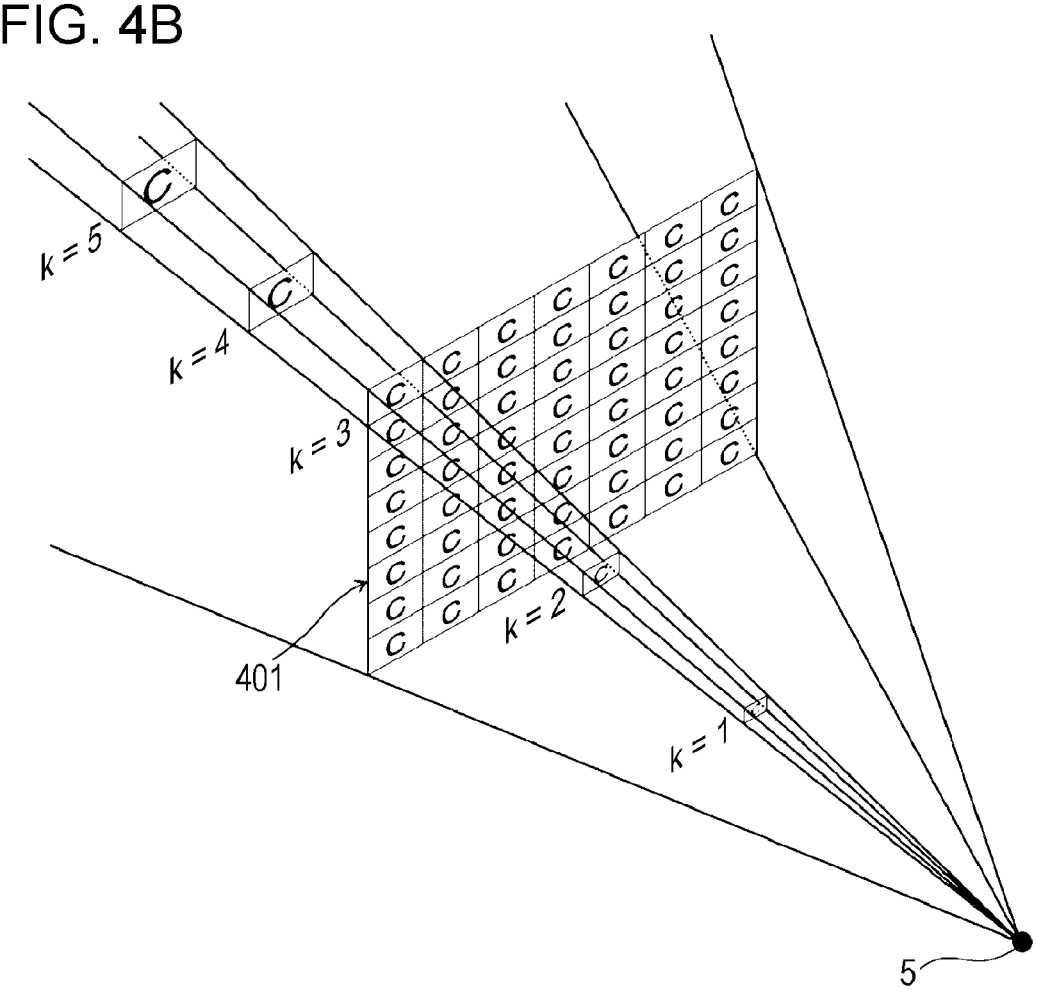
FIG. 4B shows possible imaginary light spots that are set at a plurality of distances with respect to the cells C.

Further, in the embodiment, a plurality of patterns are considered even for distances of the imaginary light spots from the image pickup unit 5. More specifically, as shown in FIG. 4B, a plurality of possible imaginary light spots whose distances from the center of the image pickup unit 5 differ are set for the respective cells C. By a method described later, a possible imaginary light spot at which the evaluation function $E_{ev}$ is smallest among the possible imaginary light spots is selected as an imaginary light spot of the corresponding cell C.

Next, the sensitivity coefficient $\alpha_{ij}$ will be described.

The sensitivity coefficient $\alpha_{ij}$ of each photodetector 4 is a value that is determined on the basis of the relationship between the positions of a light source and the lens 2 (or the photodetector 4). In the embodiment, the sensitivity coefficient $\alpha_{ij}$ of each photodetector 4 is defined as multiplication between a function $\beta$ that depends upon the distance between the light source and the photodetector 4 and a function f related to an angle of incidence of light with respect to the corresponding lens 2.

The function $\beta$ is a factor that indicates distance decay, in which the intensity of light is reduced so as to be inversely proportional to the square of the distance from the light source. In a three-dimensional coordinate system in which the position of the photodetector j is the origin, if the coordinates of the imaginary light spot i are $(x_{ij}, y_{ij}, z_{ij})$, the function $\beta$ can be expressed by the following Formula (2). In the following Formula (2), C represents a light attenuation constant.

$$\beta(x_{ij}, y_{ij}, z_{ij}) = \frac{C}{x_{ij}^2 + y_{ij}^2 + z_{ij}^2} \quad (2)$$

The function f is a factor that indicates the characteristics of each lens 2. If, for example, in the three-dimensional coordinate system, a light-receiving plane matches an XY plane, it is possible to express the function f as a function of an angle $\theta$ between an XZ plane and a direction from the center of the photodetector j to the imaginary light spot i, and an angle $\phi$ between a YZ plane and the direction from the photodetector j to the imaginary light spot i. $\theta$ and $\phi$ are expressed by the following Formulas (3) and (4), respectively:

$$\theta = \cos^{-1}\left(\frac{x}{\sqrt{x_{ij}^2 + z_{ij}^2}}\right) \quad (3)$$

$$\phi = \cos^{-1}\left(\frac{y}{\sqrt{y_{ij}^2 + z_{ij}^2}}\right) \quad (4)$$

Therefore, the sensitivity coefficient $\alpha_{ij}$ in the embodiment can be expressed as in the following Formula (5) using the functions $\beta$ and f:

$$\alpha = \beta(x_{ij}, y_{ij}, z_{ij}) f(\theta, \phi) \quad (5)$$

$$= \frac{C}{x_{ij}^2 + y_{ij}^2 + z_{ij}^2} f\left(\cos^{-1}\left[\frac{x}{\sqrt{x_{ij}^2 + z_{ij}^2}}\right], \cos^{-1}\left[\frac{y}{\sqrt{y_{ij}^2 + z_{ij}^2}}\right]\right)$$

Here, in the embodiment, as information for determining the sensitivity coefficient $\alpha_{ij}$ of each photodetector 4, information concerning the function f and C in the function $\beta$ are stored in the sensitivity coefficient storage section 21. C and the function f can be determined by previously performing calibration. If, for each lens 2, information of the function f is previously provided by, for example, a manufacturer, this information may be stored. If it can be thought that the lenses 2 corresponding to the respective photodetectors 4 have common characteristics, information may be thought of as being common to each of the photodetectors 4. On the other hand, if it can be thought that the lenses 2 corresponding to the respective photodetectors 4 have different characteristics, different information may be used for each set of photodetectors 4 and lenses 2.

Next, the evaluation function $E_{ev}$ and a basic evaluation function E will be described.

In the embodiment, as described above, the model in which one photodetector 4 receives light from the plurality of imaginary light spots i $(1 \leq i \leq m)$ is used. Therefore, if the light beam of the imaginary light spot i is $u_i$ and the sensitivity coefficient of the photodetector j with respect to the imaginary light spot i is $\alpha_{ij}$, an ideal output signal $O_j$ corresponding to the photodetector j can be obtained by the following Formula (6):

$$O_j = \sum_{i=1}^{m} \alpha_{ij} \cdot u_i \quad (6)$$

Therefore, if the difference between the output signal $S_j$ corresponding to the photodetector j and the ideal output signal $O_j$ is a partly estimated error $e_j$, the sum of the square of a partly estimated errors regarding the number n of photodetectors can be expressed as the basic evaluation function E as in the following Formula (7):

$$E = \sum_{j=1}^{n} e_j^2 \quad (7)$$

$$= \sum_{j=1}^{n} (S_j - O_j)^2$$

$$= \sum_{j=1}^{n} \left(S_j - \sum_{i=1}^{m} \alpha_{ij} \cdot u_i\right)^2$$

Here, the output signal $S_j$ corresponding to the photodetector j is an output signal from the image pickup unit 5, and the sensitivity coefficient $\alpha_{ij}$ can be obtained on the basis of the relationship between the positions of the imaginary light spot and the photodetector relative to each other and the information stored in the sensitivity coefficient storage section 21. Therefore, what is unknown is only $u_i$. Accordingly, focusing attention on the partly estimated error $e_j$ of the photodetector j, and rearranging $e_j$ with regard to the unknown $u_i$, it is possible to separate terms that include the unknown $u_i$ and those that do not include the unknown $u_i$ from each other as shown in the following Formula (8):

$$e_j = S_j - O_j = (S_j - O_j + \alpha_{ij} \cdot u_i) - \alpha_{ij} \cdot u_i \quad (8)$$

In this Formula (8), the term $(S_j - O_j + \alpha_{ij} \cdot u_i)$ is such that the unknown $u_i$ component included in the ideal output signal $O_j$ is canceled. Therefore, it is a term that does not include the unknown $u_i$.

By applying a modified formula regarding $e_j$ to the basic evaluation function E, it is possible to, as shown in the following Formula (9), express the basic evaluation function E as a convex downward quadratic function regarding the unknown $u_i$.

$$E = \sum_{j=1}^{n} (S_j - O_j)^2 \quad (9)$$

$$= \sum_{j=1}^{n} \{(S_j - O_j + \alpha_{ij} \cdot u_i) - \alpha_{ij} \cdot u_i\}^2$$

$$= \sum_{j=1}^{n} (S_j - O_j + \alpha_{ij} \cdot u_i^2) -$$

$$2u_i \sum_{j=1}^{n} \alpha_{ij}(S_j - O_j + \alpha_{ij} \cdot u_i) + u_i^2 \sum_{j=1}^{n} \alpha_{ij}^2$$

Here, if $u_i$ is considered as a variable in the basic evaluation function E, an m number of variables $u_i$ has a linear independent relationship. Therefore, if each value of the m number of variables $u_i$ is a minimum, the basic evaluation function E becomes a minimum. Therefore, it is possible to minimize the basic evaluation function E independently for each variable $u_i$.

Accordingly, Formula (9) is modified to the following Formula (10):

$$E = A_i^2 u_i^2 - 2A_i B_i u_i + C_i = (A_i u_i - B_i)^2 + C_i - B_i^2 \quad (10)$$

Here, $A_i$, $B_i$, and $C_i$ are expressed as in the following Formulas (11) to (13), respectively:

$$A_i^2 = \sum_{j=1}^{n} \alpha_{ij}^2 \quad (11)$$

$$A_i B_i = \sum_{j=1}^{n} \alpha_{ij}(S_j - O_j + \alpha_{ij} \cdot u_i) \quad (12)$$

$$C_i = \sum_{j=1}^{n} (S_j - O_j + \alpha_{ij} \cdot u_i)^2 \quad (13)$$

Here, the value of the variable $u_i$ that minimizes the basic evaluation function E, that is, an axis value of the quadratic function, becomes $B_i/A_i$. Further, by modifying $u_i = B_i/A_i$ as follows, it is possible to obtain a updating Formula (14) of the variable $u_i$:

$$u_i = \frac{B_i}{A_i} = \frac{A_i B_i}{A_i^2} = \frac{\sum_{j=1}^{n} \alpha_{ij}(S_j - O_j + \alpha_{ij} \cdot u_i)}{\sum_{j=1}^{n} \alpha_{ij}^2} \quad (14)$$

$$= \frac{u_i \sum_{j=1}^{n} \alpha_{ij}^2 + \sum_{j=1}^{n} \alpha_{ij}(S_j - O_j)}{\sum_{j=1}^{n} \alpha_{ij}^2}$$

$$= u_i + \frac{1}{\sum_{j=1}^{n} \alpha_{ij}^2} \cdot \sum_{j=1}^{n} \alpha_{ij}(S_j - O_j)$$

A processing flowchart for calculating $u_i$, which represents the light beam of each imaginary light spot, using the updating Formula (14), will be described later.

Here, in the embodiment, the basic evaluation function E is not used as it is. Rather, as shown in Formula (1), $u_i$, which represents the light beam of each imaginary light spot, is calculated using the evaluation function $E_{ev}$ in which a squared term $r_{ij}^2$ of the variable $r_{ij}$, representing the distance between the imaginary light spot i and the photodetector j, is introduced.

The reasons for using the evaluation function $E_{ev}$ will hereunder be described.

An imaginary light spot that is set near the image pickup unit 5 is where distance decay when the photodetector is receiving light is small, so that the sensitivity coefficient $\alpha_{ij}$ is large. In the quadratic function represented by Formula (9), the $\alpha_{ij}^2$ term is provided with the coefficient of $u_i^2$. Therefore, the closer an imaginary light spot is set to the image pickup unit 5, the larger the coefficient of $u_i^2$, and the higher the sensitivity with respect to the basic evaluation function E. This means that, even if the amount of change in the light beam of the imaginary light spot is the same, the closer the imaginary light spot is set to the image pickup unit 5, the larger the amount of change in the value of the basic evaluation function E. Therefore, if an algorithm, in which a plurality of possible imaginary light spots whose distances from the center of the image pickup unit 5 differ are set and in which a possible imaginary light spot that minimizes the basic evaluation function E is selected as an imaginary light spot of the cell C from the possible imaginary light spots, is used, the following problem occurs. That is, since the possible imaginary light spot that is set closer to the image pickup unit 5 can easily reduce the basic evaluation function, it tends to be selected.

Therefore, in the embodiment, in order to eliminate the influences of such distance decay, the evaluation function $E_{ev}$ in which the distance between the imaginary light spots and the image pickup unit is normalized is used. More specifically, the evaluation function $E_{ev}$ is such that the coefficient of $u_i^2$ is provided with the multiplication terms of $\alpha_{ij}^2$ and $r_{ij}^2$ by introducing the squared term $r_{ij}^2$ of the distance. An imaginary light spot that is set close to the image pickup unit 5 is such that the sensitivity coefficient $\alpha_{ij}$ becomes large while the distance $r_{ij}$ becomes small. An imaginary light spot that is set far away from the image pickup unit 5 is such that the sensitivity coefficient $\alpha_{ij}$ becomes small while the distance $r_{ij}$ becomes large. Therefore, in the evaluation function $E_{ev}$ including the above, the coefficient of $u_i^2$ is normalized, as a result of which the sensitivity of $u_i$ with respect to the evaluation function $E_{ev}$ can be equalized.

By similarly modifying the formula as mentioned above using the evaluation function $E_{ev}$, it is possible to obtain the following updating Formula (15) of the variable $u_i$:

$$u_i = u_i + \frac{1}{\sum_{j=1}^{n} r_{ij}^2 \cdot \alpha_{ij}^2} \cdot \sum_{j=1}^{n} r_{ij}^2 \cdot \alpha_{ij}(S_j - O_j) \quad (15)$$

Figure 6:
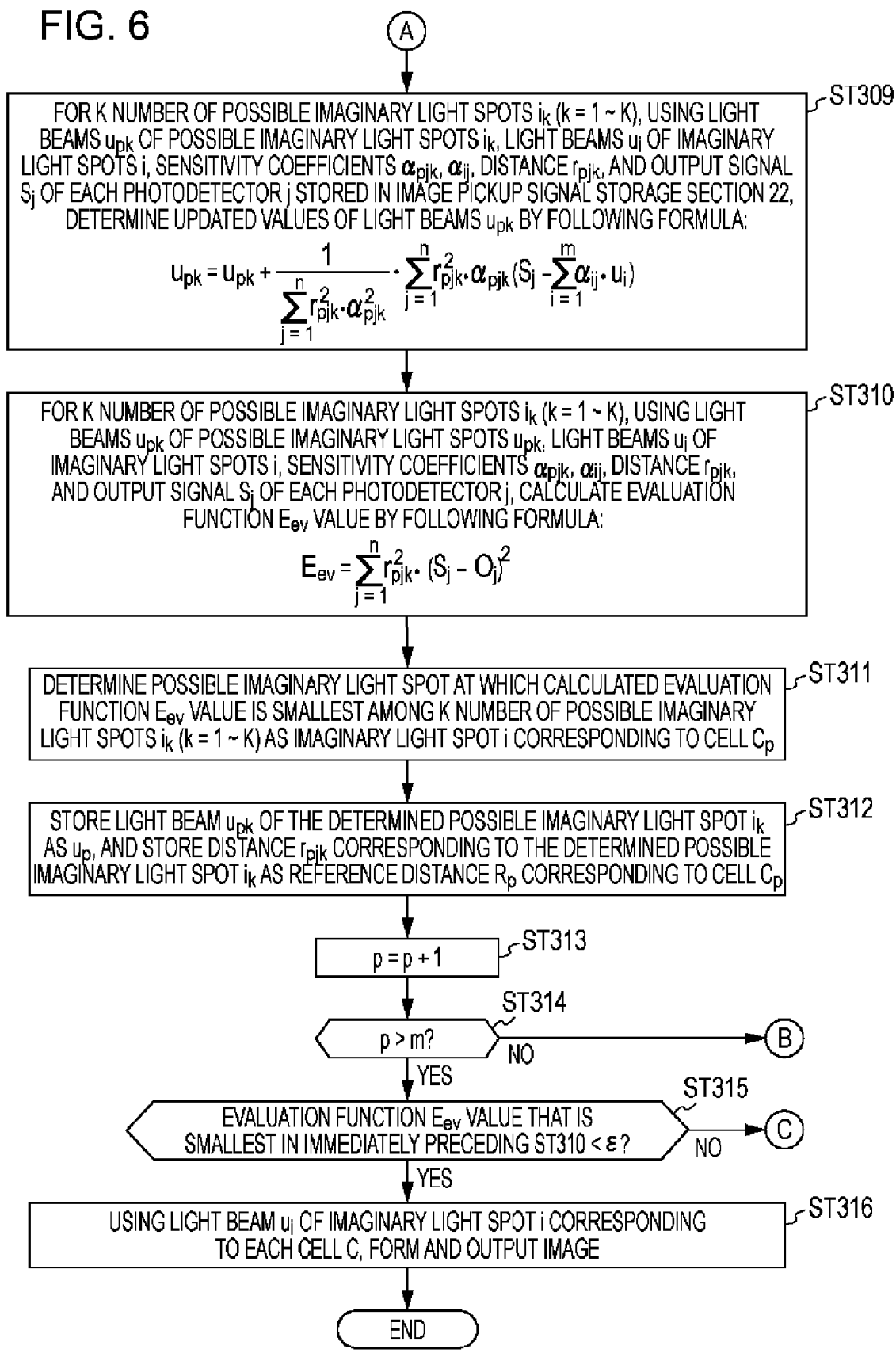
FIG. 6 is a flowchart of operations of the image reproducing section 23 of the image pickup device 1.

FIGS. 5 and 6 are flowcharts of the content of the operations of the image reproducing section 23 of the image pickup device 1. The content of the operations will hereunder be described with reference to the flowcharts. In the specification, the steps (including partial steps that are not given reference numerals) shown in, for example, each of the flowcharts can be executed in parallel or by arbitrarily changing the order within a range that is consistent with the content of the operations.

If the data obtaining part 201 of the image reproducing section 23 detects that a user has given a shooting instruction by, for example, pressing a shutter button of the image pickup device 1, output signals corresponding to the respective photodetectors 4 are obtained from the image pickup unit 5 (ST301), and are stored in the image pickup signal storage section 22 (ST302).

Next, as shown in FIG. 4A, the light spot setting part 202 of the image reproducing section 23 sets the image pickup area 401 in the light-receiving area 402, divides the image pickup area 401 into a lattice form, and sets an m number of cells $C_i$ (i=1~m) (ST303).

Next, for the imaginary light spots i that are set in correspondence with the respective cells $C_i$, the initial values of the light beams $u_i$ and the initial value of a reference distance $R_i$ from the center of the image pickup unit 5 are set (ST304). The initial values may be the same or different for the cells $C_i$. For example, the initial values of the light beams $u_i$ may be 0, and the initial value of the reference distance $R_i$ may be 5 m.

Next, the light spot setting part 202 initializes a variable p (initial value=1) (ST305).

Next, the light spot setting part 202 selects a cell $C_p$ that is specified by the variable p (ST306).

Next, with respect to the selected cell $C_p$, the light spot setting part 202 determines the K number of possible distances in which a reference distance $R_p$ is, for example, the middle value. As shown in FIG. 4B, the light spot setting part 202 sets the K number of possible imaginary light spots $i_k$ (k=1~K) at the positions that are separated by the determined possible distances from the center of the image pickup unit 5 on a straight line connecting the center of the image pickup unit 5 and the cell $C_p$, to set all light beams $u_{pk}$ thereof to $u_p$. For the cells $C_i$ other than the cell $C_p$, the light spot setting part 202 sets the imaginary light spots i at the positions that are separated by the reference distance $R_i$ from the center of the image pickup unit 5 on straight lines connecting the center of the image pickup unit 5 and the cells $C_i$ (ST307). The possible distances and the value of K may be set in accordance with the computing capability of the controller 8. If the possible distances are negative, the corresponding possible imaginary light spots are not set.

Next, for the K number of possible imaginary light spots $i_k$ (k=1~K) corresponding to the cell $C_p$, the sensitivity coefficient determining part 203 determines the sensitivity coefficient $\alpha_{pjk}$ corresponding to each photodetector j. In addition, for the imaginary light spots corresponding to the cells $C_i$ other than the cell $C_p$, the sensitivity coefficient determining part 203 determines the sensitivity coefficient $\alpha_{ij}$ corresponding to each photodetector j (ST308).

As mentioned above, the sensitivity coefficient $\alpha_{pjk}$ can be determined as follows. The sensitivity coefficient storage section 21 is referred to. Using distances $r_{pjk}$ between the photodetectors j and the possible imaginary light spots $i_k$ and using the light attenuation constant C, the value of the function β is determined. Using θ and φ, which depend upon the relationship between the positions of the photodetectors j and the possible imaginary light spots $i_k$ relative to each other, the value of the function f is determined. Then, the value of the function β and the value of the function f are multiplied to each other to obtain the sensitivity coefficient $\alpha_{pjk}$. The sensitivity coefficient $\alpha_{ij}$ can be similarly determined as follows. Using distances $r_{ij}$ between the photodetectors j and the imaginary light spots i and using the light attenuation constant C, the value of the function β is determined. Using θ and φ, which depend upon the relationship between the positions of the photodetectors j and the imaginary light spots i relative to each other, the value of the function f is determined. Then, the value of the function β and the value of the function f are multiplied to each other to obtain the sensitivity coefficient $\alpha_{ij}$.

Next, for the K number of possible imaginary light spots $i_k$ (k=1~K), using the light beams $u_{pk}$ of the possible imaginary light spots $i_k$, the light beams $u_i$ of the imaginary light spots i, the sensitivity coefficients $\alpha_{pjk}$ and $\alpha_{ij}$, the distance $r_{pjk}$, and the output signals $S_j$ of the respective photodetectors j stored in the image pickup signal storage section 22, the light beam calculating part 204 determines the updated values of the light beams $u_{pk}$ by the following Formula (16) (ST309). As mentioned above, the evaluation function $E_{ev}$ can be considered as a quadratic function of $u_{pk}$. Therefore, by updating the $u_{pk}$ values so that they become axis values in accordance with the following Formula (16) obtained by applying Formula (14) to $u_{pk}$, it is possible to reduce the evaluation function $E_{ev}$. In the following Formula (16), when i=p, $O_j$ is calculated with $\alpha_{ij}=\alpha_{pjk}$ and with $u_i=u_{pk}$.

$$u_{pk} = u_{pk} + \frac{1}{\sum_{j=1}^{n} r_{pjk}^2 \cdot \alpha_{pjk}^2} \cdot \sum_{j=1}^{n} r_{pjk}^2 \cdot \alpha_{pjk}^2 (S_j - O_j) \quad (16)$$

$$= u_{pk} + \frac{1}{\sum_{j=1}^{n} r_{pjk}^2 \cdot \alpha_{pjk}^2} \cdot \sum_{j=1}^{n} r_{pjk}^2 \cdot \alpha_{pjk}^2 \left( S_j - \sum_{i=1}^{m} \alpha_{ij} \cdot u_i \right)$$

Next, for the K number of possible imaginary light spots $i_k$ (k=1~K), using the light beams $u_{pk}$ of the possible imaginary light spots $i_k$, the light beams $u_i$ of the imaginary light spots i, the sensitivity coefficients $\alpha_{pjk}$ and $\alpha_{ij}$, the distance $r_{pjk}$, and the output signals $S_j$ of the respective photodetectors j, the light beam calculating part 204 calculates the value of the evaluation function $E_{ev}$ by the following Formula (17) (ST310):

$$E_{ev} = \sum_{j=1}^{n} r_{pjk}^2 \cdot (S_j - O_j)^2 \quad (17)$$

Next, the light beam calculating part 204 determines a possible imaginary light spot at which the calculated evaluation function $E_{ev}$ is smallest among the K number of possible imaginary light spots as an imaginary light spot of the corresponding cell $C_p$ (ST311). Then, it stores the light beam $u_{pk}$ of the determined possible imaginary light spot $i_k$ as $u_p$, and stores the distance $r_{pjk}$ corresponding to the determined possible imaginary light spot $i_k$ as the reference distance $R_p$ corresponding to the cell $C_p$ (ST312).

Next, the p value is incremented by +1 (ST313), and whether or not the p value is greater than m (the number of cells C) is determined (ST314).

If the p value is less than or equal to m, the image reproducing section 23 proceeds to ST306, to execute the operations of ST306 to ST314 for the next cell C.

In contrast, if the p value is greater than m, that is, if the determination of the imaginary light spots i for the m number of cells C is completed, the light beam calculating part 204 determines whether or not the value of the evaluation function $E_{ev}$ that is smallest in the immediately preceding ST311 is less than the threshold value $\epsilon$ previously provided as a completion condition (ST315).

If the value of the evaluation function $E_{ev}$ that is smallest in the immediately preceding ST311 is greater than or equal to the threshold value $\epsilon$, the image reproducing section 23 proceeds to ST305, to execute the operations of ST305 to ST315.

In contrast, if the value of the evaluation function $E_{ev}$ that is smallest in the immediately preceding ST311 is less than the threshold value $\epsilon$, the image outputting part 205 forms an image using the light beams $u_i$ of the imaginary light spots i of the respective cells C and outputs it to, for example, a liquid crystal monitor 9 (ST316), to end the processing. The formed image may be recorded onto (output to) a memory (such as the transportable storage medium 11 or the rewritable non-volatile memory 16).

According to the image pickup device 1 of the embodiment, since it is not necessary to separate the lenses 2 from the corresponding photodetectors 4 by the focal length, compared to the case in which the lenses and the photodetectors are separated from each other by the focal length as in the related image pickup device, it is possible to make thin the image pickup device 1 (the image pickup unit 5).

Using the model in which light from the plurality of imaginary light spots is received by the respective photodetectors, light beams from the respective imaginary light spots are estimated using the sensitivity coefficients and the output signals corresponding to the respective photodetectors. Using brightnesses corresponding thereto as brightnesses of the respective pixels of the image corresponding to the image pickup area, an image is reproduced. Therefore, a focusing operation with respect to an image pickup object is no longer required, as a result of which, during a pickup operation, a continuous shooting operation can be performed at a high speed. In this case, if the continuously shot image is continuously reproduced/displayed, a moving image can also be reproduced.

In particular, if the image reproducing section 23 detects a shooting instruction from a user, data obtained from the image pickup unit 5 is stored in the memory (the transportable storage medium 11 or the rewritable nonvolatile memory 16). If the image reproducing section 23 receives the shooting instruction from the user, the image is reproduced, so that it is possible to perform a continuous shooting operation at a high speed (obtain output data of the image pickup unit) without taking time to perform the image reproducing operation.

Further, since the image pickup unit 5 can be formed by causing the lenses 2 and the photodetectors 4 to be in a one-to-one correspondence and bringing them close to each other (that is, contacting them to each other), it is possible to considerably reduce the burden of aligning the lens system and image sensors.

In addition, according to the embodiment, since, in reproducing the image, distance information (the distances $r_{pjk}$ stored in ST312) to the imaginary light spots can also be obtained, it is possible to use it as a three-dimensional distance sensor.

Although an embodiment of the present disclosure is described above, the present disclosure is not limited to the above-described embodiment, and can be variously modified and applied.

Modification

For example, if the image pickup unit 5 is formed so that light subjected to color separation by color filters is received by the photodetectors 4 through the lenses 2, it is possible to pick up and reproduce a color image.

In addition, the function $f(\theta, \phi)$, which is a factor that represents the characteristics of the lenses 2, can be determined by performing the following calibration.

For example, as shown in FIG. 7A, a light source L is disposed in a three-dimensional coordinate system in which the position of a photodetector 601 is the origin and in which a light-receiving plane of the photodetector 601 is made to match an xy plane. More specifically, the light source L is disposed where the distance from the photodetector 601 is $r_1$, the angle between an xz plane and a direction towards the light source L from the photodetector 601 is $\theta_1$ as shown in FIG. 7B, and the angle between a yz plane and the direction towards the light source L from the photodetector 601 is $\phi_1$. In addition, the light source L emits light of a light beam u, and the light is received by the photodetector 601 through a lens.

In this case, the sensitivity coefficient $\alpha$ when $\beta_1 = C/r_1^2$, $\theta_1$, $\phi_1$ can be determined by the following Formula (18) using the light beam u and a signal S that is output via the corresponding photodetector 601:

$$\alpha = \frac{S}{u} \tag{18}$$

Here, as mentioned above, the sensitivity coefficient $\alpha$ is defined as a multiplication of $\beta$ and $f(\theta, \phi)$. Therefore, the function $f(\theta_1, \phi_1)$ is determined by dividing the determined $\alpha$ by $\beta_1$.

Accordingly, the position of the light source L or the positions of the photodetector 601 and a lens 602 are changed to determine $f(\theta_1, \phi_1)$ corresponding to various $\theta_1$ and $\phi_1$. For example, the product of Gauss functions are fitted as in, for example, $f(\theta_1, \phi_1) = g_1(\theta) g_2(\phi)$ in which $g_1$ and $g_2$ are Gauss functions, to determine the function $f(\theta, \phi)$. In this case, variances or average values, which are parameters, of $g_1(\theta)$ and $g_2(\phi)$ may be stored in the sensitivity coefficient storage section 21.

By determining the function $f(\theta, \phi)$ and storing the parameters thereof in this way, when executing the image reproducing operation, it is possible to determine the value of the function $f(\theta, \phi)$ for any $\theta, \phi$ determined in accordance with the setting of the cells C and the image pickup area.

Instead of storing the parameters of the function $f(\theta, \phi)$ in the sensitivity coefficient storage section 21, as shown in FIG. 7C, a table that stores the values of $f(\theta, \phi)$ corresponding to the values of $\theta, \phi$ may be stored. In addition, the image pickup device 1 may have a calibration function in which, in accordance with the instruction of a user, the light attenuation constant C and the function $f(\theta, \phi)$ are determined and information thereof is stored in the sensitivity coefficient storage section 21.

In addition, although, as mentioned above, the setting of the imaginary light spots onto the image pickup area can be specified by a user each time a shooting operation or an image reproducing operation is performed, the setting of the cells C (that is, the setting of the imaginary light spots) may also be specified by the user each time a shooting operation or an image reproducing operation is performed. In such a structure, it is possible for the user to reproduce an image by freely setting the resolution in a range satisfying the condition in which the number m of imaginary light spots≦the number n of photodetectors.

In particular, the setting of the image pickup area and the setting of the cells C are both information required in the image reproducing operation. Therefore, it is possible to obtain output data of the image pickup unit without performing these settings during the pickup operation, and for the user to perform these settings during reproduction of an image to reproduce the image. In such a structure, during the reproduction of the image, it is possible for the user to select any area in the light-receiving area as the image pickup area (that is, image reproduction area), and set any resolution in the range satisfying the condition in which the number m of imaginary light spots≦the number n of photodetectors with respect to the image pickup area, to reproduce the image.

Figure 8A:
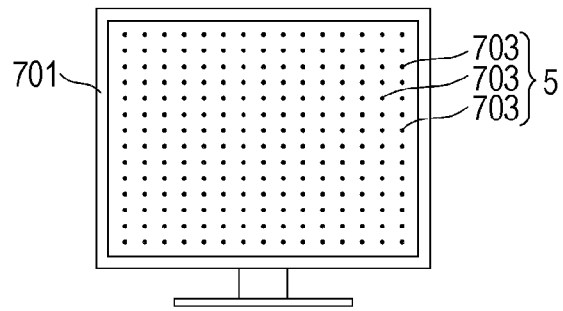
FIG. 8A illustrates an embodiment in which an image pickup unit and a display device are integrated to each other.
Figure 8B:
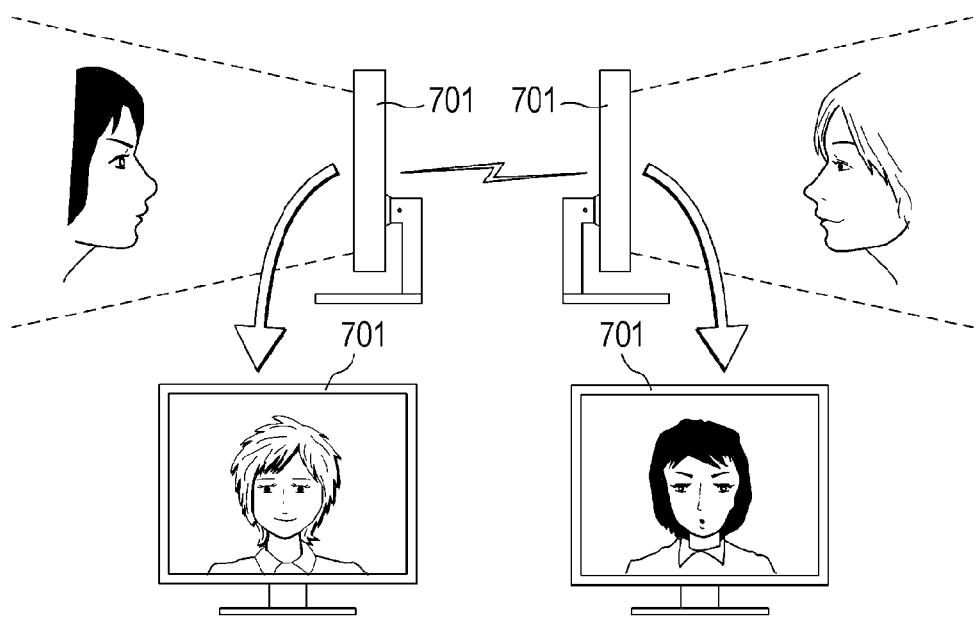
FIG. 8B illustrates a scene in which the embodiment shown in FIG. 8A is used.
Figure 8C:
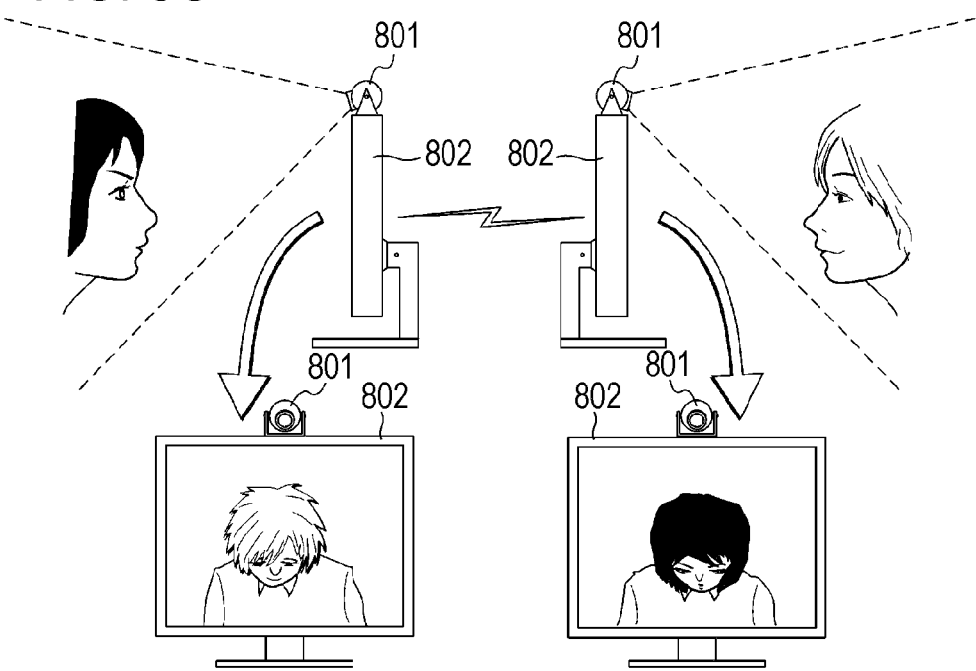
FIG. 8C illustrates a scene in which a related television telephone device is used.

The image pickup device according to the present disclosure is applicable to an endoscopic camera or a television telephone device (television conference device). If it is applied to a television telephone device, as shown in FIG. 8A, a display device 701 that displays an image of a caller (that is, an image of the face of the caller) and the image pickup unit 5 according to the present disclosure can be combined and integrated to each other. More specifically, an image pickup unit also serving as a display device is formed so that a plurality of sets 703 of the photodetectors 4 and the lenses 2 of the image pickup unit 5 according to the present disclosure are disposed on a display screen (such as a liquid crystal panel) of the display device 701 at a predetermined interval (for example, they are uniformly distributed in a person display area that is assumed during the call). In a related television telephone device, as shown in FIG. 8C, since an image pickup unit 801 and a display device 802 are separately provided (for example, a camera is mounted on the top portion of a liquid crystal display), it is difficult to talk to a person displayed on the display screen while looking at his/her eyes. On the other hand, if the display device 701 and the image pickup unit 5 according to the present disclosure are combined and integrated to each other, the image pickup unit 5 is disposed on the display screen. Therefore, as shown in FIG. 8B, it is possible to talk to a person displayed on the display screen while looking at his/her eyes.

According to those skilled in the art, in the specification, the claims, and the drawings, a disjunctive expression that indicates a plurality of selective words essentially means that all the words, only one of the words, either one of the words, or both of the words are included. For example, the phrase "A or B" may mean "A" or "B," or "A and B."

What is claimed is:

1. An image pickup device comprising:
an image pickup unit including an n number of photodetectors and an n number of lenses (where n>=2), the lenses being provided in a one-to-one correspondence with the photodetectors, the lenses being provided so that light is incident upon only the respective photodetectors, the image pickup unit outputting signals corresponding to the respective photodetectors;
a sensitivity coefficient storage section that stores information for determining sensitivity coefficients of the photodetectors; and
an image reproducing section that reproduces an image using the signals that are output by the image pickup unit and the sensitivity coefficients that are determined on the basis of the information stored in the sensitivity coefficient storage section,
wherein the image reproducing section includes:
part for obtaining the signals that are output by the image pickup unit;
part for setting a plurality of imaginary light spots in an image pickup area so that a number m of imaginary light spots≦the number n of photodetectors;
part for determining the sensitivity coefficient corresponding to each imaginary light spot for each photodetector on the basis of the information stored in the sensitivity coefficient storage section;
part for determining $u_i$ so that $E_{ev}$ determined by the following formula is equal to or less than a threshold value $\epsilon$:

$$E_{ev} = \sum_{j=1}^{n} r_{ij}^2 \cdot \left( S_j - \sum_{i=1}^{m} \alpha_{ij} \cdot u_i \right)^2$$

where a light beam of an imaginary light spot i is $u_i$, the sensitivity coefficient of a photodetector j corresponding to the imaginary light spot i is $\alpha_{ij}$, the distance between the imaginary light spot i and the photodetector j is $r_{ij}$, and the signal corresponding to the photodetector j that is output by the image pickup unit is $S_j$; and
part for forming and outputting the image using the determined $u_i$.

2. An image pickup device comprising:
an image pickup unit including an n number of photodetectors and an n number of lenses (where n>=2), the lenses being provided in a one-to-one correspondence with the photodetectors, the image pickup unit outputting signals corresponding to the respective photodetectors; and
an image reproducing section which, on the basis of a model in which a plurality of imaginary light spots are set in an image pickup area and light from the imaginary light spots is received by the respective photodetectors, forms and outputs an image using light beams of the respective imaginary light spots that are determined using the signals corresponding to the respective photodetectors that are output by the image pickup unit and using sensitivity coefficients of the respective photodetectors corresponding to the respective imaginary light spots.

3. The image pickup device according to claim 2, wherein the lenses are superposed upon the respective photodetectors so that light is incident upon only the respective photodetectors.

4. An image pickup device comprising:
an image pickup unit including an n number of photodetectors and an n number of lenses (where n>=2), the lenses being provided in a one-to-one correspondence with the photodetectors, the image pickup unit outputting signals corresponding to the respective photodetectors;
a sensitivity coefficient storage section that stores information for determining sensitivity coefficients of the photodetectors; and
an image reproducing section that reproduces an image using the signals that are output by the image pickup unit and the sensitivity coefficients that are determined on the basis of the information stored in the sensitivity coefficient storage section,
wherein the image reproducing section includes:

part for obtaining the signals that are output by the image pickup unit;

part for setting a plurality of imaginary light spots in an image pickup area so that a number m of imaginary light spots≦the number n of photodetectors;

part for determining the sensitivity coefficient corresponding to each imaginary light spot for each photodetector on the basis of the information stored in the sensitivity coefficient storage section;

part for determining $u_i$ so that $E_{ev}$ determined by the following formula is equal to or less than a threshold value $\epsilon$:

$$E_{ev} = \sum_{j=1}^{n} r_{ij}^2 \cdot \left( S_j - \sum_{i=1}^{m} \alpha_{ij} \cdot u_i \right)^2$$

where a light beam of an imaginary light spot i is $u_i$, the sensitivity coefficient of a photodetector j corresponding to the imaginary light spot i is $\alpha_{ij}$, the distance between the imaginary light spot i and the photodetector j is $r_{ij}$, and the signal corresponding to the photodetector j that is output by the image pickup unit is $S_{ij}$; and part for forming and outputting the image using the determined $u_i$.

5. The image pickup device according to claim 4, further comprising:

a display unit that displays the output image, wherein the photodetectors are disposed at a display screen of the display unit.

6. The image pickup device according to claim 4, wherein the information stored in the sensitivity coefficient storage section includes at least information regarding a function $f(\theta, \phi)$ indicating the characteristics of the lenses, where, in a three-dimensional coordinate system in which a light-receiving plane of the photodetectors matches an XY plane, $\theta$ is an angle between an XZ plane and a direction from the center of each photodetector to each imaginary light spot, and $\phi$ is an angle between a YZ plane and the direction from each photodetector to each imaginary light spot.

7. The image pickup device according to claim 4, wherein the part for setting the imaginary light spots sets the image pickup area or the imaginary light spots on the basis of an input of a user.

8. The image pickup device according to claim 4 further comprising:

an image pickup signal storage section that stores the signals output by the image pickup unit, wherein, if a shooting instruction is given by a user, the part for obtaining the signals stores the signals obtained from the image pickup unit in the image pickup signal storage section, and wherein, if an instruction of image reproduction is given from the user, the part for determining $u_i$ reads out the signal $S_j$ corresponding to the photodetector j output by the image pickup unit from the image pickup signal storage section.

9. An image reproducing device comprising:

part for obtaining signals corresponding to respective photodetectors that are output from an image pickup unit including an n number of photodetectors (where n>=2) and an n number of lenses that are provided in a one-to-one correspondence with the photodetectors;

a sensitivity coefficient storage section that stores information for determining sensitivity coefficients of the photodetectors;

part for setting a plurality of imaginary light spots i in an image pickup area so that a number m of imaginary light spots≦the number n of photodetectors;

part for determining the sensitivity coefficient corresponding to each imaginary light spot for each photodetector on the basis of the information stored in the sensitivity coefficient storage section;

part for determining $u_i$ so that $E_{ev}$ determined by the following formula is equal to or less than a threshold value $\epsilon$:

$$E_{ev} = \sum_{j=1}^{n} r_{ij}^2 \cdot \left( S_j - \sum_{i=1}^{m} \alpha_{ij} \cdot u_i \right)^2$$

where a light beam of an imaginary light spot i is $u_i$, the sensitivity coefficient of a photodetector j corresponding to the imaginary light spot i is $\alpha_{ij}$, the distance between the imaginary light spot i and the photodetector j is $r_{ij}$, and the signal corresponding to the photodetector j that is output by the image pickup unit is $S_j$; and part for forming and outputting an image using the determined $u_i$.

10. A method of reproducing an image, comprising the steps of:

obtaining signals that are output from an image pickup unit including an n number of photodetectors and an n number of lenses (where n>=2) provided in a one-to-one correspondence with the photodetectors;

setting a plurality of imaginary light spots in an image pickup area so that a number m of imaginary light spots≦a number n of photodetectors;

determining sensitivity coefficients corresponding to the respective imaginary light spots for the respective photodetectors;

determining $u_i$ so that $E_{ev}$ determined by the following Formula is equal to or less than a threshold value $\epsilon$:

$$E_{ev} = \sum_{j=1}^{n} r_{ij}^2 \cdot \left( S_j - \sum_{i=1}^{m} \alpha_{ij} \cdot u_i \right)^2$$

where a light beam of an imaginary light spot i is $u_i$, the sensitivity coefficient of a photodetector j corresponding to the imaginary light spot i is $\alpha_{ij}$, the distance between the imaginary light spot i and the photodetector j is $r_{ij}$, and the signal corresponding to the photodetector j that is output from the image pickup unit is $S_j$; and forming and outputting the image using the determined $u_i$.

* * * * *

UNITED STATES PATENT AND TRADEMARK OFFICE
CERTIFICATE OF CORRECTION

PATENT NO. : 7,898,591 B2
APPLICATION NO. : 12/640986
DATED : March 1, 2011
INVENTOR(S) : Ueda Page 1 of 1

It is certified that error appears in the above-identified patent and that said Letters Patent is hereby corrected as shown below:

In Column 4, Line 62, delete "DESCRIPTION" and insert -- DETAILED DESCRIPTION --, therefor.

In Column 6, Line 46, delete "$\alpha a_{ij}$," and insert -- $\alpha_{ij}$, --, therefor.

In Column 12, Lines 37-42, in Equation (16), delete "
$$u_{pk} = u_{pk} + \frac{1}{\sum_{j=1}^{n} r_{pjk}^2 \cdot \alpha_{pjk}^2} \cdot \sum_{j=1}^{n} r_{pjk}^2 \cdot \alpha_{pjk}^2 (S_j - O_j)$$

$$= u_{pk} + \frac{1}{\sum_{j=1}^{n} r_{pjk}^2 \cdot \alpha_{pjk}^2} \cdot \sum_{j=1}^{n} r_{pjk}^2 \cdot \alpha_{pjk}^2 \left( S_j - \sum_{i=1}^{m} \alpha_{ij} \cdot u_i \right)$$
" and insert --
$$u_{pk} = u_{pk} + \frac{1}{\sum_{j=1}^{n} r_{pjk}^2 \cdot \alpha_{pjk}^2} \cdot \sum_{j=1}^{n} r_{pjk}^2 \cdot \alpha_{pjk} (S_j - O_j)$$

$$= u_{pk} + \frac{1}{\sum_{j=1}^{n} r_{pjk}^2 \cdot \alpha_{pjk}^2} \cdot \sum_{j=1}^{n} r_{pjk}^2 \cdot \alpha_{pjk} \left( S_j - \sum_{i=1}^{m} \alpha_{ij} \cdot u_i \right)$$
--, therefor.

In Column 17, Line 25, in Claim 4, delete "$S_{ij}$;" and insert -- $S_j$; --, therefor.

Signed and Sealed this
First Day of May, 2012

David J. Kappos
*Director of the United States Patent and Trademark Office*